Aug. 4, 1964  C. M. RIFENBERGH  3,143,637
THERMAL CONTROL SYSTEM
Filed Oct. 12, 1960
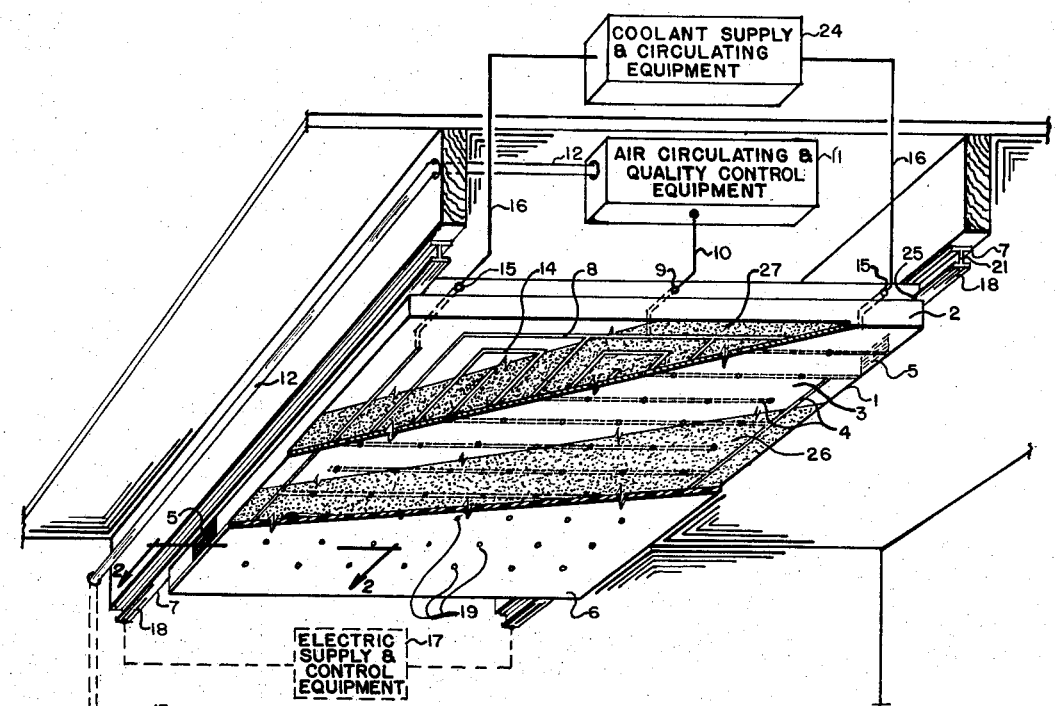
FIG. 1.
RETURN AIR
REGISTER
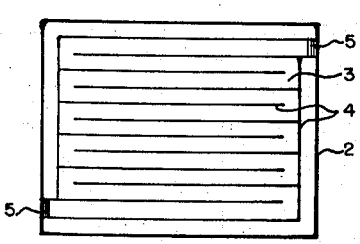
FIG. 3.
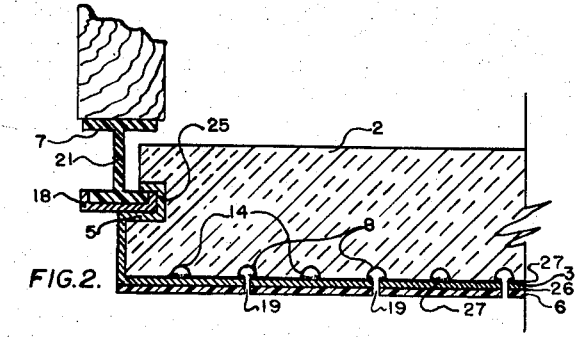
FIG. 2.
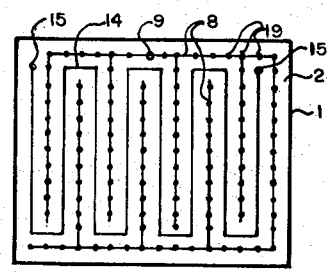
FIG. 4.
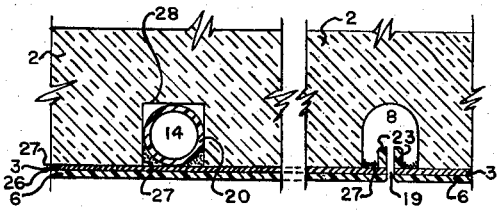
FIG. 5.   FIG. 6.
INVENTOR United States Patent Office 3,143,637
Patented Aug. 4, 1964

3,143,637
THERMAL CONTROL SYSTEM
Clare Morgan Rifenbergh, Chicago, Ill.; Elizabeth Margaret Rifenbergh, executrix of said Clare Morgan Rifenbergh, deceased; John J. Turner, administrator of said Elizabeth Margaret Rifenbergh, deceased, assignor of one-half to Isaac Hillock, Port Huron, one-sixth each to Sarah L. Rifenbergh and Florence Cleaver, Detroit, and one twenty-fourth each to Marilyn Hochkins, Livonia, Darlene Seescholtz, Wayne, Sandra Hayes, Detroit, and Lee M. Rifenbergh, Inkster, Mich.
Filed Oct. 12, 1960, Ser. No. 62,264
8 Claims. (Cl. 219—345)

My invention is principally concerned with systems and means for the control of thermal and related factors affecting human comfort and health in homes, commercial and industrial buildings, and occupancies and enclosures of all types. The objectives of this invention are thus largely directed to the supply of heat in an efficient and economical manner during cold weather, or as needed; and to the removal of excess or unwanted heat in a similarly efficient and economical manner during hot weather, or as required. As the maintenance of an optimum degree of human comfort and well-being also entails the control of such factors as air circulation or ventilation, relative humidity, odor, and air cleanliness, further objectives of this invention are directed to efficient, economical, and effective means for control of these factors as well.

It is a noteworthy and fortunate circumstance that the means supplied by this invention also provide for an effective measure of noise reduction and control as well as a very effective method of fire protection without entailing appreciable added complexity or cost.

A further basic objective is the inherent provision of an effective amount of high-quality thermal insulation for the spaces or areas to which these means are applied.

Although the aforesaid broad and inclusive combination of functional properties would ordinarily infer the use of an extremely complex and costly means, or aggregation of apparatus, this invention is further basically directed to the performance of each such function as recited, and/or any combination thereof, by apparatus of the utmost simplicity and economy of design and manufacture to provide high operating efficiency of each cited function at lower operating cost than is now common with present equipment, even though the latter be of highly complex and specialized nature incorporating a multiplicity of separate units and systems, each designed for the individual performance of but a single said listed function.

Furthermore, the construction of these means utilizes cheap and readily available materials; cheap and common methods of manufacture and installation; and, rapidly and economically installed in any type of occupancy or other enclosure, these means provide highly efficient operation over indefinitely long periods without requiring expensive maintenance or replacement of costly wearing parts.

This invention employs improved means of supplying heat by conversion of electric to thermal energy in an improved form of radiant heating source. While the many advantages of electric and radiant heating systems have long been recognized, a principal restrictive disadvantage of their use has resided in their high cost of operation relative to common systems using direct combustion of fuels such as gas, oil, and coal. Thus a principal and primary objective of my invention lies in the provision of, in combination, improved radiant and electric heating means which permit the maintenance of a given desired temperature of operation, or degree of thermal comfort, at a much reduced electric energy demand level which may be, in a proper installation of the type to be described, as low as one-half or less of the energy demand per unit volume or area required by present electric and other systems.

Further objectives and advantages of my invention will become apparent from the following description referring to the accompanying drawing and the features of novelty which characterize my invention will be pointed out with particularity in the claims annexed to and forming part of this specification.

In the drawing FIG. 1 is a perspective view of a general arrangement of a heating, cooling, and ventilating panel made and installed according to this invention, with portions shown in broken-away fashion to more clearly depict the detailed construction thereof. FIG. 2 is a cross-sectional view of a portion of the same unit taken along lines 2—2 of FIG. 1. FIGURES 3 and 4, respectively, show in diagrammatic form the layouts of the electric heating element and of the channels provided for cooling and air circulation in each panel unit. FIGURES 5 and 6 are sectional views showing details of the coolant and air circulation channels, respectively.

Like reference characters indicate similar parts in the different figures of the drawing.

In FIG. 1 I illustrate a heating-cooling-ventilating panel constructed according to my invention as it might be installed as part of the ceiling area in an enclosed space or occupancy unit, or room, of common wood-frame construction. While but one panel or unit is shown in this figure it is to be understood that the means provided allow for installation of as many units as may be required to effect total coverage of any nature, size, or extent, of any horizontal surface such as a ceiling area, or of any vertically or otherwise positioned surface such as a wall.

In FIG. 1 the panel unit 1 is comprised, in part, of a structural base element or body 2 which is formed preferably of a low-density, low-thermal-conductivity, thermal insulating material of rigid or semi-rigid nature such as, for example but not by way of restriction or limitation, polystyrene or other synthetic foam, glass-fiber board, wood-fiber board, or the like.

In the construction of FIG. 1 panel 1 is supported and secured by elements 7 which are secured by suitable means, not shown, to the framing of the fitted space and shaped to engage with mating slots 25 in the edges of panel 1. Elements 7 are preferably made of a cheap, non-conductive plastic material in the general form illustrated with a flexible central member or web 21 and additionally incorporate the integrally bonded electric conductor elements 18 and which, in combination, act as structural supports for one or more panel units 1 as well as to supply means for the simple and rapid installation and electrical connection of same. Thus by these means the fitting of an entire ceiling or wall area may be readily and cheaply accomplished by first installating whatever amount of hanger elements 7 as may be required on proper spacings, preferably matching or coordinated with the framing layout; then, by starting at one side and working towards the other, and by bending the lower or contacting portion to one side, any number of panel units 1 may be rapidly snapped into place, simultaneously accomplishing the electrical connection of each such unit, to cover areas of any extent. It is to be understood that "dummy" panels carrying no heating or other elements may be cut to size as required to fill areas where light fixtures or the like may be located, and to fill around the perimeter of the fitted space. As the light, cheap, plastic piping and ductwork required for the cooling and air quality control functions, as will later be described, may be simply and rapidly installed in the space above or to the rear of the panels as placement of the latter progresses, the installation of the required means for operation of the complete system as described herein, as well as the provision of a completely finished ceiling or wall installation may be seen to be a cheap, quick and easily accomplished procedure. It is additionally worthy of note that the outer protective cover 6 may be made of any one of a great variety of materials to function as a finished decorative surface in itself or to provide a suitable base for further decorative treatment such as paint, wallpaper, or any other material or process desired. For example, element 6 may be made of plastic sheet as indicated by the section of FIG. 2, or of wood-veneer, paper, fabric, or the like, substantially without limitation of any kind except for the desirability of restricting its thickness to a relatively small fraction of an inch.

While the means shown for mounting of the panel elements 1 in FIG. 1 are particularly directed to the rapid and inexpensive installation of these means, it will be understood that alternate methods of mounting and installation of such panel units are also suitable and may be more appropriate under certain conditions. For example, where the body element 2 is one or more inches in thickness, as is desirable, the required connective wiring, piping, and ductwork may be concealed in slots cut in the edges or rear surfaces of the panel 1, thus permitting their installation by cementing to an existing plaster or other ceiling or wall surface. Other alternate methods not shown but well known to those versed in the building arts may be considered suitable as well and should be understood to fall within the scope of this invention whether or not so specifically stated.

Heat is provided in the construction illustrated in FIG. 1 by electrical energization, at line or transformer-reduced voltage, of element 3 which is formed of very thin metal sheet or foil (its thickness being shown in greatly exaggerated proportion in FIG. 1 for clarity) which is covered by the protective and insulating element 6. Current for this purpose is supplied from the externally located Electric Supply and Control Equipment 17 through insulated conducting members 18, which comprise integrally bonded portions of the supporting hangers 7, to and through terminals 5 in secure contact therewith, and hence through element 3 to result in the uniformly distributed generation of heat over substantially the entire surface of panel units 1, and thus to result in a very effective and efficient source of radiant heat extending over the entire fitted area. Extension of conductor elements 18 across the fitted area permits the electric energization of whatever number of panel units 1 as is required to fill the mounting space thus provided; sectionalizing of the said supply and control means may be provided as desired. Either manual or automatic thermostatic control is, of course, applicable according to standard practice to any grouping or arrangement of such panel units.

In the construction illustrated in FIG. 1 removal of heat, or cooling, is supplied by the Coolant Supply and Circulating Equipment 24, which may be remotely located externally to the fitted space, in combination with coolant channels 14, which are integrally contained in panel body 2 and which are closely juxtaposed to the interior surface of metal element 3, fitted openings 15, and piping 16 to permit the chilling and circulation of a coolant medium (which may be of a fluid or gaseous nature; cold water being ordinarily adequate) and thus to extract or transfer heat absorbed by conductive or radiant transfer by element 3 and the other elements comprising panel unit 1, and to discharge or exhaust same externally to the fitted and controlled space. It will be understood that heating elements 3 will not be energized when the cooling facilities are in use; however its good thermal conductive properties are very effective in the gathering, conduction and transfer of externally incident heat from the controlled space to the cooling medium even as the same properties are effective in the distribution and transfer of internally generated heat when energized. Inasmuch as the interconnecting piping will normally (see later material for an exception to this condition) carry only a chilled coolant under very low pressure it may be made of cheap, light-weight, plastic pipe or tubing with plastic fittings and cemented connections which eases its rapid and inexpensive installation. While FIG. 1 illustrates the installation of but a single panel unit 1, it is to be understood that the provisions made for piping of the coolant medium are designed to permit ready interconnection and flow between panels in either series or parallel arrangement in cases of multiple panel installations.

Uniform and draft-free ventilation or air circulation and control of air quality factors such as humidity, cleanliness, odor, etc., is furnished by the external Air Circulating and Quality Control Equipment 11 which operates to draw air from the controlled space through closely spaced, multiple openings or ports 19, which extend through cover and heating elements 6 and 3, respectively, to communicate with channels 8, the said channels 8, fitted opening 9, duct 10, to and through Equipment 11, wherein such air quality control measures as are provided are effected, to be returned to the controlled space (except under special operating modes to be later described) through air return duct 12 and register 13. Means for controlling the direction of air flow, such as dampers, are included in the ductwork or in Equipment 11 when needed, as are any required automatic or other control means. Due to the uniform distribution of multiple ports 19 over the entire fitted area, very satisfactory, draft-free ventilation is provided by these means without the necessity of high-velocity air movement and without the necessity of handling an extremely large volume of air at any given point. Thus the use of light and inexpensive ductwork is permitted which leads directly to rapid, easy, and cheap installation procedures. Similarly to the installation of piping for cooling, previously described, it is to be understood that, although the illustration of FIG. 1 shows only a single panel unit 1, the use of multiple panel units with interconnected ventilating ductwork is to be considered as an integral part of this invention.

It is noteworthy that certain additional benefits result automatically and inherently from the construction described which provide added functional value and utility of these means at little or no additional cost or complication. One such inherent functional benefit lies in the fact that the provision of the multiplicity of holes or ports 19 in the outer surface of the panel 1, which communicate with and provide for air motion through channels 8, permits an effective degree of noise reduction and control through utilization of the well-known and widely utilized phenomenon of sound entrapment and dissipation in holes, perforations, and similar openings leading into the interior of low-density, fibrous or cellular material of the nature which has been previously specified as preferable for the composition of bodies 2. Another very valuable functional feature which automatically and inherently results from the described construction of these units 1 lies in the supply of an extremely effective means of fire protection for any fitted space. This function is readily and inexpensively accomplished by providing automatically operated valves, responsive to dangerous high temperatures, which are connected to divert or direct water, gas, or any suitable fire extinguishing agent into the passages 8 normally used for air circulation. As these channels are supplied with the described multiplicity of ports 19 opening into the controlled space from the ceiling and/or walls thereof, this alternative facility offers the practical possibility of utilization, in combination, as an automatic sprinkler or wide-area fire-extinguisher distributon system at very low additional cost. It is also obvious that, with the cooling channels 14 filled with a fluid circulating coolant such as water, damage to the panel units themselves due to fire can be held to a minimum.

A simple method of manufacture of panel units 1 as shown in FIG. 1 includes, as an initial step, the forming of the coolant channels 14 and the air channels 8 in one surface of body 2. I have found a rigid, expanded polystyrene foam board, of two-inch thickness and one pound per cubic foot density, which is a cheap and readily available material, to be a very satisfactory material for this element. The coolant channels 14 are formed by pressing a heated metal bar or rod into the surface of the foam panel in the pattern shown by the plain lines of the serpentine or zig-zag pattern illustrated in FIG. 4. The air channels 8 are similarly formed in the pattern shown by the dot-superimposed lines also illustrated in FIG. 4. It will be noted that the air channels 8 are preferably positioned between adjacent sections of the coolant channels 14. Coolant channels 14 are provided with terminal and connective openings 15, and air channels 8 with connective openings 9, which may be formed internally in the polystyrene foam body 2 simply by the insertion of a heated metal rod. It is to be understood that the specific placement of said connective openings may be made as desired and preferably in such a manner and location as to ease the connection of the external piping and ductwork. A simple method of providing either rigid or flexible connective fittings for the said connective openings in polystyrene foam bodies 2 lies in the cementing of same into the outer portions of said openings 15 and 9 with a filled epoxy cement or adhesive which, upon setting, forms a permanent, fluid and gas tight junction of considerable mechanical strength. Specific dimensions of the said channels and the spacing between them will be determined by the cooling and ventilating capacity required for a given installation. However it has been found by experiment that channels for both purposes equivalent to a ⅜ inch diameter circle tangent to the panel body surface, spaced on ¾ inch centers, provide adequate capacity for the average household installation. It is worth of note that the formation of channel grooves in polystyrene foam by the use of a heated metal rod, which may be replaced in production by a heated die or mold, results in the forming of smooth channel walls of greater density than the average for the foam body and, inasmuch as the basic polystyrene material is impervious to moisture to a very high degree, the resulting channels, when covered to form complete tubular passages as will be described later, present substantially optimum properties as cheaply made, essentially leak-proof, integral means for the circulation of fluid or gaseous coolant agents as well as for the directed circulation of air. Alternate methods of forming the portions of these channels contained in body 2 obviously include molding, die-forming, cutting, sawing, etc.

A second preparatory step prior to the complete assembly of a panel unit 1 includes the cementing together of elements 3 and 6, and the forming of element 3 into the series-connected pattern of relatively long, narrow strips as shown in FIG. 3. It is to be understood that elements 3 and 6 are cemented together to form, in combination, a closure for the open grooves formed in the surface of body 2 as aforesaid and, after cementing securely thereto, to form a tight seal and protective cover over the entire lower or outer surface of body 2. To secure a permanent liquid and gas-tight bond of high structural quality, possessed of good electrical insulating properties, as well as permanent integrity as a fastening and sealing element at temperatures in the range up to 200° F., it is imperative to use a cement or adhesive of very high and dependable qualities. Thus it is my strong preference to utilize a thermo-setting type synthetic resin adhesive to meet these requirements and I have specifically found by experiment that epoxy resins and compounds are especially suitable and possessed of more than adequate properties to answer the requirements of the construction described. A wide variety of these materials are readily available as standard commercial items. Element 3 is preferably made of a very thin metal sheet or foil; in actual practice I have found an ordinary, inexpensive grade of aluminum foil of 0.00035 inch thickness to represent a very satisfactory material for this purpose. While such a type, form, and composition of material constitutes a novel departure from established practice in the construction of electric resistance heating elements, I have found sound theoretical reasons for its use, details of which are later discussed, which have been proven by actual experiment to unmistakably confirm that, in this described type and range of service, the application and use of thin metal foil in this manner supplies an increase in efficiency and economy of operation, as compared with conventional types and arrangements of electric heating elements, of a very substantial order. As the next step in the panel assembly procedure I secure a plain sheet of this foil to the upper or internal face of cover element 6 with epoxy resin adhesive 26. After setting of the adhesive I then cut or slot through the foil layer only, as indicated by 4, FIG. 1, to form the serpentine strip pattern illustrated partially by the cut-away portions of FIG. 1 and diagrammed fully in FIG. 3, to provide the equivalent of a long, narrow, continuously connected and segregated strip of aluminum conductor only 0.00035 inch thick which, by adjustment of the slot spacing, and thus of strip width, may be made of proper electric resistance for operation at any desired voltage level from normal line-voltage values of 115 or 230 volts (for larger panel areas) to as low a value as may be found desirable. It is to be understood that while the drawing shows the segregated strips of element 3 positioned at right angles to the coolant and air channels 14 and 8, respectively, this specific relative placement is not a necessary requirement as said placement may be made in any manner desired to best fit the specific construction and design details employed. A number of thermal and electrical advantages of this type of arrangement will be discussed later. After formation of the said pattern of segregating slots (which need be no wider than 0.015–0.025 inch wide) 4 in the foil sheet, now affixed securely to the inner surface of the cover 6 as described, this sub-assembly is covered with a relatively thick or heavy coating 27 of adhesive and secured firmly in the position shown by FIG. 1 to the previously formed surface of the body 2. Setting of the thermosetting adhesive, which may be accomplished rapidly by the application of low degrees of heat, then results in a permanent and secure bond between the ungrooved portions of the surface of body 2 and the upper or interior surface of the said sub-assembly comprising elements 3 and 6, which is possessed of very adequate structural, physical and thermal properties. The said application of a relatively thick or heavy coat of adhesive also results in the formation of a very adequate and permanent, moisture-impermeable, electrical insulating layer over the portions element 3 which would otherwise be exposed to the coolant medium, when present in channels 14, and to moisture which might result from condensation in air channels 8. I thus close off the open sides of the grooves previously placed as described in the surface of body 2 to result in the formation of a number of closed tubular passages or channels 14 and 8, for coolant and air, respectively, which are sealed within the composite panel assembly 1 except for the fitted terminal connecting means 15 and 9, respectively, installed as previously described. A cross-section of a portion of such a complete assembly is shown in FIG. 2 which shows the final result following a further step of manufacture which comprises the drilling, punching, or other suitable forming of the ports 19 to provide communicating air passages between air channels 8 through elements 3 and 6 to the air content of the controlled space. The ports 19 may be of relatively small diameter (⅛ to 3/16 inch, approximately) and may be preferably but not necessarily positioned to coincide with the intersection of slots 4 in element 3 and the air channels 8, as is indicated in FIG. 1, thus providing for a minimum reduction in the cross-sectional area in any of the segregated conductive strips comprising element 3. However the slot-spacing of element 3 may also be arranged to permit a desirable closer spacing of ports 19 in cases where a maximum air flow is required.

A final step in the panel assembly procedure comprises the fastening of the foil strips terminals 5 (the terminals of the segregated foil strips making up elements 3) to the contours of the side or edge slots 25 in body 2, as shown in FIG. 2, to permit subsequent firm contact and good electrical connection thereof to conductive elements 18 in the final installation to hangers 7.

In FIG. 5 I show a partial cross-sectional view of the construction suitable for coolant channels 14 as might be advisable or preferred in cases where body 2 might be made of, for example, a porous wood-fiber or similar board or panel. In this case a slot 28 is formed, as by sawing, in the surface of the body 2 and the actual coolant channel 14 is supplied by an added tubular element 20 which is sized to fit snugly within slot 28 and be secured and retained therein by the subsequent addition of elements 3 and 6 and adhesive 27 as previously described. Tubular element 20 may be made of any suitable material such as a plastic composition, metal, etc., and permits the use of normally permeable materials for the manufacture of bodies 2 in a comparable manner to the previously described procedure and method which is intended for application in connection with impermeable materials such as the polystyrene foam used in the first example. This method of assembly also provides for greater isolation of the coolant medium from the other elements of the panel assembly and thus may be preferred in cases where special coolants, higher operating pressures, or extremes of temperatures may be found desirable.

In FIG. 6 I show a partial cross-sectional view of an arrangement of air channels 8 in which special means are provided to insure that any moisture condensed on the interior walls thereof will be prevented from returning down (in the case of ceiling installations) through the ports 19 and thus result in a nuisance or, at the least, a damp ceiling, and to additionally provide more positive measures for the drainage and removal of such condensate than heretofore described. While a flow of dehumidified air through channels 8 will ordinarily result in such condensate being absorbed and carried away automatically by the construction previously described, cases where such condensation may be abnormal or excessive may warrant the provision of added measures such as the supply of element 23 as shown in FIG. 6 which is properly positioned and cemented by adhesive 27 as shown, or otherwise suitably secured, to the inner surface of the sub-assembly comprising elements 3 and 6 prior to their final assembly with body 2 as described. This element can also be of the nature of a formed or molded rib or ridge-like member in the surface of an element, not shown, which can be adhesively secured to cover the entire inner face of the said sub-assembly of elements 3 and 6 before final assembly thereof to body 2, and to be interposed therebetween. In either case the purpose of element 23 is to form a raised rib extending into the interior of air channel 8 in which the ports 19 are so placed that, with the panel of which it is a component part placed in an inverted horizontal position as a ceiling unit, any condensate forming on the walls of channels 8 will tend to collect in the lower spaces between said walls and the sides of the said inwardly extending element 23 and thus be prevented from escaping downwards through ports 19. Simple and common means, not shown, may be provided in the interconnecting ductwork to collect and drain off such excessive condensate from panels or groups thereof as may be required.

It may be noted that the matter of dimensioning panel units 1 is entirely a matter of choice and not critical in any way. It will normally be advisable to produce same in modular sizes coordinated with building framing sizes which are more or less standardized in this country. Thus a group of standard modular panel sizes might comprise units of 16, 18, and 24 inches square; and rectangular units 3 x 6 feet, 4 x 8 feet, or any desired subdivision or multiple of same. The thickness dimension may preferably be limited to a minimum of the order of one inch but may be increased as desired to provide whatever degree of thermal insulation is determined to be necessary.

It is to be understood that the constructions shown in the several figures of the drawing, which have been described herein in detail, endeavor to illustrate and explain the simplest possible mode of construction, manufacture, installation, and operation of these means which comprise this invention and that many variations thereof may be employed, as will be apparent, by those skilled in the appropriate arts. However, while many such alternatives in detail may be utilized to achieve the separate or combined objectives which this basic invention satisfies, such alternate methods, processes, and/or combinations of the general classes of materials for the purposes described herein are to be regarded as included within the broad scope of this invention whether specifically so stated or not.

As mentioned previously, a sound theoretical basis exists which has been experimentally checked to prove the unique advantages of the novel construction described for panel units 1. This basis stems primarily from the well-known fundamental relationships between heat, temperature, and the elemental properties of material bodies which are expressed in the long-established, basic equation:

$$Q = SM(t' - t)$$

in which $Q$ = quantity of heat, as in B.t.u. (British thermal units); $S$ = Specific Heat, a basic characteristic of a specific element or material; $M$ = Mass, as pounds of weight; $t$ = an initial temperature level (in Fahrenheit degrees); said $t'$ = an elevated temperature level (in ° F.) to which a mass M of a material possessing a specific heat characteristic S is raised by the supply of Q B.t.u. of thermal energy, or its exact equivalent, $\frac{1}{3.413}$ electrical watts.

It will be noted that the amount of heat required to raise a material body such as a heating element, for example, through a given temperature range is directly proportional to the product of its weight and its specific heat. In actual practice the total quantity of heat required merely to raise and maintain the heating element to and at a proper operating temperature will always include an appreciable additional amount which is required to fill and maintain the thermal content of what may be termed a leaky thermal reservoir comprised of its own supports and housing and, as well, substantial portions of the building structure, such as the nearby sections of a ceiling or wall, to which such a unit is normally securely and conductively attached. This appreciable amount of heat, which, following electrical practice, may be termed thermal "excitation" energy, represents what must be regarded as a non-productive or dead load in the particular case of a radiant heating system as it results in a negligable amount of radiant output of the nature desired. Additionally, the greater part of this essentially uncontrolled heat flow is lost and wasted by conduction into the building structure to be dissipated eventually by conductive and radiant transfer to the surrounding general environment. It must be understood that the quantity of heat actually delivered to the heated space and its contents necessarily, by the terms of the basic equation cited above, comprises an additional quantity over and above the thermal excitation energy or heat required to establish and maintain a proper operating temperature of the heating unit itself; and that it is only delivered after the said excitation requirements are first supplied. The importance of reducing the said excitation requirements and the very appreciable amounts of energy wasted thereby, appears to have been largely neglected in the design of presently available electric heating units as it commonly is in the design and construction of fuel-fired systems and their components. Thus the use of electricity as a basic energy source for heating human occupancies and other enclosures has come to be regarded as a luxury appropriate only to those able to disregard the normal economic considerations, or for heating only in those regions where a mild climate obtains or where abnormally low electric rates prevail. However, it must be realized that electric energy, as delivered to the user, is essentially the purest form of energy available, with no inherent waste content whatsoever, and that, as such, it deserves careful handling, control, and conservation to avoid loss and waste, even after conversion to the form of heat. Thus, when proper means are made available for the proper conservation and usage thereof, it can be found, as I have demonstrated by actual experiments utilizing the means comprising this invention, that radiant electric heating systems and means can be proven to be the most economical of any as well as being, as is well known, the cleanest, safest, most conveniently operated and controlled, most easily maintained, and most capable of producing the highest degree of healthful comfort of all available systems and means.

From the basic fundamental relationships cited above it is easily seen that a minimum quantity of thermal excitation energy will be required by constructing a heating unit with a conversion element formed of a material possessing the lowest possible density, or weight per unit volume or per unit area for a given thickness, as well as a minimum specific heat constant, and by providing same with a support or mounting possessed of the lowest possible unit density and thermal conductivity, and a maximum specific heat constant. Practical radiant sources must operate at relatively low temperatures, if for no other reason than safety from fire and burning of the users thereof, including babies and children, and a preferable compatibility with ordinary construction materials and furnishings which generally possess comparatively low ignition points. This results directly in the general specifications of wide-area sources to produce the necessary total amount of heat required which is proportional to the product of source area and temperature. It has been established that very adequate comfort levels are supplied by wide-area radiant sources, such as ceiling or wall areas of substantial extent, operated at temperatures in the approximate range of 85 to 110° F. Such wide-area sources obviously demand a high measure of directly applied and effective thermal insulation to prevent excessive waste of the thermal energy produced and to minimize excessive thermal excitation requirements. Such direct and properly effective insulation of wide-area radiant sources is not normally supplied as an integral part of such installations up to the present time and thus the high potential economy of such systems has not been obtained.

It may be noted that the constructions and methods comprising this invention result essentially in the supply of a more than ordinarily effective degree of thermal insulation to the equipped space at no cost whatever as the said insulating material is provided as a replacement for the relatively expensive supports and housings normally required by commonly available electric heating devices.

It may be seen, from the foregoing premises, to be very desirable that any said radiant heating element should permit its arrangement to cover large areas in a practical manner, and preferably at reasonable cost. It is also preferable that the element be possessed of a reasonably high degree of thermal conductivity to provide and maintain a uniform distribution of heat over the entire fitted area. As an electrical resistance element it must possess appropriate ohmic properties to permit its proper and uniform distribution over the entire fitted area and its efficient energization at readily available voltages and in reasonable circuit arrangements. It should possess characteristics which permit the use of a minimum of weight of material for each unit of the fitted area. Its properties must permit easy and cheap fabrication in combination with the previously specified low-density thermal insulating material preferred as a support or base structure.

It is a particularly fortunate circumstance that a cheap, ordinary commercial grade of aluminum foil, readily available (being widely used as a wrapping for cigarettes, foods, etc.) as a standard commercial item in a thickness of 0.00035 inch, has been experimentally proven to present, in combination, almost an optimum array of properties for this application and thus to permit the practical and very economical realization of each of the objectives of this invention which depend directly upon the properties of the heating element itself. However it must not be assumed that the practice of this invention is restricted to the sole use of aluminum foil as a heating element material as certain other relatively low-density, low-specific-heat materials, such as magnesium, for example, and certain aluminum-magnesium alloys and other metallic and other materials, if made available at reasonable cost, can exceed the performance of aluminum foil in this application. It must also be realized that the simple use of very thin, low-density conductive sheet or foil is not the sole factor productive of the desirable results described in the foregoing material, but that its successful operational combination with appropriate low-density, supporting materials of low thermal conductivity and other suitable properties, by appropriate and economical methods and in suitable forms producible at low cost, is of the greatest practical importance as well.

In the experimental tests of these means it was determined that suitable resistive properties for the foil elements 3 of a 24" x 48" panel, made in the manner illustrated by FIG. 1 and using the said polystyrene foam material for body 2, was supplied by making the foil strips ¼ inch wide, i.e., by spacing the slots 4, of approximately 0.020 inch width, ¼ inch apart. This resulted in an energizing current flow of 0.555 ampere when terminals 5 were connected across a 115 volt supply and thus resulted in a power consumption of 64 watts. For the area involved, 8 square feet, this amounts to a unit-area demand of 8 watts per square foot. This energization level produced and maintained a panel surface temperature of 108° F. with the panel located in a 51° F. ambient environment of still air.

The quoted unit-area requirements of various commercially available electric heating units range between 18 and 25 watts and more per square foot for a similar temperature rise. Thus it may be seen that the application of the principles employed by the constructions comprising this invention results in a reduction of actual operating power demand to less than one-half the amount required by conventional devices. It is to be expected too that an additional improvement of efficiency and thus of economy of operation may be realized from similar panels in multiple groups which can be made by more refined methods than possible for this experimental test.

The electrical characteristics presented by the very thin foil element 3, FIG. 1, additionally offer very versatile and practical means of control not offered by any electric heating means at this time. For example, I have found that, with the very thin element distributed as described in a layer only 0.00035 inch thick, and assembled with the other elements as illustrated, the thermal and electrical conductivities of the foil material, in combination, permit the energization of said foil element at voltages of twice and three times the normal operating voltage for which the unit is designed without the development of dangerous "hot-spots" or hazardous operating conditions of any kind. This feature uniquely permits the use of simple switching methods for the application of twice normal voltage to produce four times the normal wattage or heat output, without danger, for fast warm-up or for greatly augmented output under extreme conditions. This same result may be accomplished by switching circuits arranged to transfer pairs of suitably proportioned elements from series to parallel connection at a single supply voltage. A further and preferable mode of control lies in the use of elements designed for operation at voltage levels in the 20 to 30 volt range, which may be supplied by an inexpensive step-down transformer with taps to provide variation of heat output over a considerable range, and to simultaneously reduce insulation requirements of the entire installation. Conventional thermostatic control can, of course, be applied to control temperatures produced under any of these said operating conditions for any grouping of units.

It is pertinent to point out that the temperature response of units constructed as described herein is very rapid as the very thin, low-density, uniformly distributed foil element possesses the minimum of mass; it is supported by a channelled or relieved body of low-density, low-conductivity material supplying a minimum of very poorly conductive material in contact therewith; and due to its uniform distribution in a very thin layer, any heat developed internally is almost immediately made available over its entire surface for transfer through the relatively thin covering (6, FIG. 1) and thus to be radiated to the interior of the controlled space or enclosure.

While the foregoing discussion has generally emphasized considerations related to the efficiency and economical conversion of electric to thermal energy, it should be realized that many of the same considerations apply as well to the supply and operation of the efficient and economical cooling or heat transfer and extraction means which this invention also provides as, with the exception of the energy conversion operation, the same criteria apply in substantially equal weight to the removal as well as the supply of heat.

Inasmuch as the means provided by this invention supply a variety of alternate or auxiliary modes of operation in addition to those previously described, certain of these possibilities will be briefly explained. One such operating mode comprises the auxiliary supply and distribution of heat by reversal of air flow through the ventilating means so that air is taken from the controlled space through register 13 and duct 12, FIG. 1, and directed through Equipment 11, duct 10, fitted openings 9, and internal channels 8 to emerge into the controlled space through ports 19. In this operational mode humidification of the air may readily be accomplished in cold weather, or as desired, in Equipment 11, and the air additionally warmed by passage through channels 8 in close juxtaposition to heating element 3. In extreme conditions this operating mode additionally permits the addition of heat to the circulated air, if desired, by suitable means incorporated in Equipment 11 as it passes therethrough and thus results in heating means comprising a predominantly radiant electric system of high efficiency with auxiliary means for circulated warm air heating which could be advantageously employed during exceptional climatic extremes or in exceptional cases of electric power shortage or limitation.

Another means of providing heat augmentation over and above the originally installed electric capacity, or as an auxiliary thereto or expedient replacement thereof under emergency conditions, comprises the circulation of warmed water or other suitable fluid through the cooling channels 14 of the panel unit 1 of FIG. 1, or any multiple grouping thereof. The effectiveness of this alternate operational mode may be increased by providing a reverse flow of air as described in the immediately foregoing paragraph. It will be noted that this alternate mode of operation preserves the essentially radiant nature of operation intended even though the electric conversion element 3 may not be energized. Should any extensive use be anticipated for this mode of operation it may be preferable to supply units with cooling channels designed and made in the manner illustrated in FIG. 5 and to insure that the piping and panel body materials utilized are compatible with the temperature of the warmed water. It is apparent that water heating means may be simply supplied as part of, or in combination with the nominally titled Coolant Supply and Circulating Equipment 24.

It is to be emphasized that neither of the above alternate or auxiliary operational modes is to be considered as a means of compensation for any inadequacy in the previously described radiant electric heating facilities as these means have shown positive experimental proof of performing in a far more than barely adequate manner under the most rigorous conditions. However, it is quite exceptional for any practical system—and most especially a basically electric system—to offer the many alternate and auxiliary possibilities of operation under a wide range of extreme and difficult conditions as does this system and it is only proper to point them out as inherent and valuable auxiliary properties of the system and means comprising this invention.

An additional important point lies in the fact that the means provided by this invention for cooling, ventilation, and humidity control (which comprise generally the entire functional content of the means now generally provided for the very inefficient operation known as "air conditioning") result in such high efficiency and economy in the performance thereof, and in the supply of much higher actual comfort levels during hot weather than is now provided by other means, that the use of these means for performance of those sole functions in regions where facilities for heating are not needed or desired may be considered very desirable, practical, and economical. Little would be gained by any alteration of the construction described where this purpose is intended as the very thin metal sheet element 3, FIG. 1, contributes to the cooling operation as well as in heating. However minor installation economies might be obtained by elimination of the conductor elements 18 from hanger elements 7, or by the use of alternate mounting methods.

To continue in the vein of the last paragraph, it may be pertinent to point out that the means described are especially suitable for the provision of temperature and air-quality control of refrigerated enclosures, "cold rooms," and the like in any climate or location. Operation of the heating elements 3, FIG. 1, may be properly controlled to provide defrosting as necessary, while the construction of cooling channels 14 in the manner shown by FIG. 5 permits the use of coolant temperatures, pressures, and other operating conditions as required to produce any desired reduction of temperature, and its continued maintenance, in any fitted enclosure. It may be mentioned that the ventilating or air handling provisions supplied may be of great value in this regard as the dehumification of chilled air for the purpose of frost control can be performed very effectively by these means. An additional possibility of great potential value lies in the prospect of providing, by replacement of the air return duct 12 and register 13 with an external air discharge or exhaust, greatly augmented preservative effectiveness for a refrigerated enclosure by removal of the air therefrom to as high a degree as may be desirable.

The use of comparative terms herein with respect to density, weight, conductivity, and other properties and qualities of the materials considered suitable or preferable for the heating and heat transfer element 3 in the drawing shall be understood to refer to the range of published and verified values generally accepted and established for the metallic materials magnesium, berylium, aluminum, and titanium; and for the non-metallic but electrically conductive material carbon in its various forms; and lying within the low and high limits thereof for any similar materials which may comprise alloys or other combinations of the cited materials. Similarly, the same usage of terms, when referring to properties of materials suitable for the panel body 2 of the drawing shall be understood to limits of the range of accepted and established data covering thermal insulating materials of the general nature of those herein specifically mentioned.

I claim:

1. A thermal panel unit comprising a block of thermo-insulating material having a side adapted to face an area to be thermally treated, said block having a first channel therein adjacent said side and a second channel, independent of the first channel, adjacent said side, a continuous relatively thin, narrow strip of metallic foil disposed on substantially the entire area of said side, a support sheet glued to said strip and to said side, said support sheet and strip having spaced perforations therethrough between the said first channel and the exterior of the sheet, said block having a pair of openings therethrough as a fluid inlet and a fluid outlet, respectively, for the terminal ends of said second channel, the terminal ends of said strip of metallic foil being adapted for connection to a source of electrical energy.

2. A thermal panel unit as defined by claim 1 and a tubular duct in said second channel.

3. A thermal panel unit as defined by claim 1 and a pair of longitudinal ribs in the first channel, said ribs being spaced from each other and being also spaced from the sides of the channel to form interior troughs therebetween, said perforations being in communication with the channel through the space between the ribs.

4. A thermal panel unit as defined by claim 1 in which the block is of expanded polystyrene foam.

5. A thermal panel unit as defined by claim 1 in which the metallic foil is of aluminum.

6. A thermal panel unit as defined by claim 5 in which the thickness of the foil is substantially 0.00035 inch.

7. A thermal panel unit comprising a block of thermo-insulating material having a side adapted to face an area to be thermally treated, said block having a channel therein adjacent said side, said channel having a terminal end, a continuous relatively thin, narrow strip of metallic foil having terminal ends and disposed on substantially the entire area of said side, a support sheet secured to said strip with the strip sandwiched between the support sheet and block, said support sheet and strip having spaced perforations therethrough between the said channel and the exterior of the sheet, said block having a fluid inlet for the terminal end of said channel, the terminal ends of said strip of metallic foil being adapted for connection to a source of electrical energy.

8. A thermal panel unit comprising a block of thermo-insulating material having a side adapted to be exposed to an air space to be conditioned, said block having a fluid passageway adjacent said side, a continuous relatively thin, narrow strip of metallic foil disposed on substantially the entire area of said side, means supporting the said foil on the block, said means including a support sheet on the side of the foil opposite the block, said support sheet and foil strip having spaced perforations therethrough extending from the passageway to the exterior of the sheet, said metallic strip being adapted for connection in an electrical circuit and as a heat producing resistance to an electrical current of predetermined value.

References Cited in the file of this patent
UNITED STATES PATENTS

| | | |
|---|---|---|
| 1,320,585 | Stewart | Nov. 4, 1919 |
| 1,742,159 | Hynes | Dec. 31, 1929 |
| 2,038,347 | Cornell | Apr. 21, 1936 |
| 2,502,147 | Grothouse | Mar. 28, 1950 |
| 2,504,146 | Mossin | Apr. 18, 1950 |
| 2,574,095 | Langer | Nov. 6, 1951 |
| 2,619,580 | Pontiere | Nov. 25, 1952 |
| 2,637,530 | Janos | May 5, 1953 |
| 2,715,668 | Booker et al. | Aug. 16, 1955 |
| 2,961,522 | Hammer | Nov. 22, 1960 |
| 2,962,266 | Kritzer | Nov. 29, 1960 |
| 3,020,379 | Ludlow et al. | Feb. 6, 1962 |

OTHER REFERENCES

Burgess-Manning Co., "3 Way Functional Ceiling," Bulletin No. A-138, 1955.